(12) United States Patent
Canales

(10) Patent No.: US 9,433,153 B2
(45) Date of Patent: Sep. 6, 2016

(54) APPARATUS AND METHOD FOR CLEARING DEBRIS

(71) Applicant: Miguel Angel Canales, Red Deer (CA)

(72) Inventor: Miguel Angel Canales, Red Deer (CA)

(73) Assignee: Miguel Angel Canales, Reddeer, AB (CA)

( * ) Notice: Subject to any disclaimer, the term of this patent is extended or adjusted under 35 U.S.C. 154(b) by 421 days.

(21) Appl. No.: 14/067,749

(22) Filed: Oct. 30, 2013

(65) Prior Publication Data

US 2015/0114435 A1    Apr. 30, 2015

(51) Int. Cl.
| | | |
|---|---|---|
| *B08B 1/00* | (2006.01) | |
| *B08B 7/00* | (2006.01) | |
| *A47L 5/06* | (2006.01) | |
| *A47L 5/08* | (2006.01) | |
| *A47L 5/14* | (2006.01) | |
| *A47L 5/22* | (2006.01) | |
| *A01G 1/12* | (2006.01) | |
| *E01H 5/10* | (2006.01) | |
| *A47L 5/36* | (2006.01) | |

(52) U.S. Cl.
CPC .............. *A01G 1/125* (2013.01); *A47L 5/14* (2013.01); *A47L 5/22* (2013.01); *A47L 5/365* (2013.01); *E01H 5/106* (2013.01); *B08B 2205/00* (2013.01)

(58) Field of Classification Search
CPC ....... B08B 1/00; B08B 7/00; B08B 2205/00; A47L 5/14; A47L 5/22; A47L 5/365; A01G 1/125; E01H 5/106; A61M 16/0057; A61M 16/0066; Y10T 29/49329

USPC .................. 134/37, 42; 15/330, 345, 405
See application file for complete search history.

(56) References Cited

U.S. PATENT DOCUMENTS

| | | | |
|---|---|---|---|
| 3,365,122 | A | 1/1968 | Hajec et al. |
| 4,799,287 | A | 1/1989 | Belanger et al. |
| 5,722,111 | A | 3/1998 | Sowell et al. |
| 6,135,731 | A | 10/2000 | Woolenweber et al. |
| 6,210,109 | B1 | 4/2001 | Will et al. |
| 7,997,593 | B2 * | 8/2011 | Sergyeyenko ............ B62B 1/12 15/340.2 |
| 2004/0154127 | A1 | 8/2004 | Sing et al. |
| 2007/0247009 | A1 | 10/2007 | Hoffman et al. |
| 2008/0152487 | A1 | 6/2008 | Shaffer et al. |
| 2008/0301902 | A1 * | 12/2008 | Gloger .................... A01G 1/125 15/405 |
| 2009/0271945 | A1 | 11/2009 | Ludwigson |
| 2009/0301485 | A1 | 12/2009 | Kenyon et al. |
| 2013/0087168 | A1 * | 4/2013 | James ..................... B08B 3/024 134/6 |

FOREIGN PATENT DOCUMENTS

| | | |
|---|---|---|
| CA | 2340781 | 9/2002 |
| CA | 2547747 | 10/2007 |

* cited by examiner

*Primary Examiner* — Saeed T Chaudhry

(57) ABSTRACT

Apparatus for drifting away loose items from an area, has a container with an outlet port and is rotatably supported on a base member. A top member is fixedly connected to the base member above the container. The top member has a fan that is adapted to draw air from the exterior through an inlet port and discharge the air into the interior of the container to exit from the outlet port. A motor is secured to the top member, the motor being adapted to engage with and rotate the container relative to the base member and the top member, such that the air exiting from the outlet port is driven in a circular direction.

9 Claims, 4 Drawing Sheets

APPARATUS AND METHOD FOR CLEARING DEBRIS

BACKGROUND OF THE INVENTION

1. Field of Invention

The present invention relates to debris removal in general and in particular to a method and apparatus for clearing debris from an area by the use of a central blower.

2. Description of Related Art

Clearing of loose items such as snow, dry leaves and debris from an area is commonly done by manually sweeping with a broom stick, to collect the scattered loose items in one place for pick-up and throw into the trash-bin. This being a manual process is difficult to be executed in large areas.

For large areas, electrically operated blowers are commonly used. The blowers blow out air under the action of a fan-assembly. The blower is provided with the electrically operable fan-assembly connected to a tube with a nozzle. In operation, the user can hold the tube and sway it around near the surface to be cleaned so that the pressurized air from the fan-assembly can drift away the loose items. Often the fan-assembly is to be carried by the user (generally on the shoulder) while swaying the tube around with the nozzle being closer to the area. With such a model, the user needs to support the weight of the fan-assembly and also there is significant loss of air pressure by the time the pressurized air from the fan-assembly reaches the tip of the nozzle. Hence in order to achieve a certain level of the air pressure at the nozzle, the fan-assembly needs to deliver extra pressure at the cost of extra electric power to compensate for the loss en route. In certain models, the fan-assembly is provided with wheels for placing on the ground and moving around. Though this is advantageous for the user for not having to carry around, the user needs to navigate the wheeled fan-assembly around in addition to the tube with the nozzle. This is cumbersome particularly when used on an un-leveled terrain.

SUMMARY OF THE INVENTION

The proposed apparatus is for drifting away loose items from an area. The loose items may include snow, dry leaves, debris and the like. However, it will be appreciated that the invention can be broadened for using the apparatus for any other similar purpose as well.

The proposed apparatus for drifting away loose items from an area, comprises a base member, a container rotatably supported on the base member, the container having an outlet port and a top member fixedly connected to the base member above the container. The top member has a fan therethrough adapted to draw air in from the exterior through an inlet port and discharge the air into the interior of the container to exit from the outlet port. The apparatus further comprises a motor secured to the top member, the motor being adapted to engage with and rotate the container relative to the base member and the top member, such that the air exiting from the outlet port is driven in a circular direction.

The proposed apparatus has several advantages. Herein, the user does not need to carry the load of the container when the apparatus is in operation. Besides, the air pressure generated is close to the point of use hence there is no substantial drop in the air pressure as originated. Additionally, the air exits in a concentric circular direction about the vertical axis of the container. By moving the apparatus on the area to be cleaned, the area can be more efficiently cleaned by drifting away the loose items around the apparatus. Here the user needs to navigate only one object on the area to be cleaned and that is the apparatus.

According to an embodiment, the apparatus further comprises a plurality of the outlet ports in the container. This feature will provide higher efficiency of performance of the apparatus as then more air would exit out of the outlet ports.

According to yet another embodiment the size of the inlet port is user adjustable for regulating the volume of air sucked in. Smaller the volume sucked in, lower is the exiting air. This feature is helpful for extending its usage for various kinds of applications on small or large areas, nature and size of the loose items and so on.

According to a preferred embodiment the apparatus further comprises an arm for holding and moving the apparatus in operation or otherwise, to various locations. The arm is preferably coupled to the base member for better stability of operation.

According to a preferred embodiment the outlet port(s) is/are user adjustable for regulating the direction of the exiting air from the outlet port(s) relative to the container. This feature is useful for finer adjustments of the direction of the pressurized air blowing out of the output port, as required for the application.

According to a preferred embodiment the outlet port(s) is/are user adjustable for regulating their height(s) relative to the base member. This feature is useful for adjusting the height of the exiting air in the circular direction to suit the application.

According to a preferred embodiment the apparatus is at least partially composed of a polymeric material. This feature is useful due to the non-corrosive and light weight properties of the polymeric material.

According to a preferred embodiment the apparatus further comprises movement means for moving the apparatus between various locations.

More details about these features will become apparent to those skilled in the art in the following detailed description of the illustrative embodiments exemplifying the best mode for carrying out the disclosure as presently perceived.

The present invention consists of certain novel features and a combination of parts hereinafter fully described and illustrated in the accompanying drawing, it being understood that various changes in the details may be possible without departing from the scope of the invention or sacrificing any of the advantages of the present invention.

According to a further embodiment of the present invention there is disclosed a method for removing loose items away from an area, the method comprising providing a base member and a top member fixedly connected to said base member and rotatably supporting a container on said base member between said base member and said top member, said container having an outlet port. The method further comprises drawing air in from the exterior through an inlet port in said top member into the interior of said container to exit from said outlet port and rotating said container relative to said base member and said top member, such that the air exiting from said outlet port is driven in a circular direction.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

The following description presents several preferred embodiments of the present invention in sufficient detail such that those skilled in the art can make and use the invention.

Before describing in detail embodiments that are in accordance with the present invention, it should be noted that all of the figures are drawn for ease of explanation of the basic teachings of the present invention only. The extension of the figures with respect to the number, position, relationship and dimension of the parts of the preferred embodiment will be within the skill of the art after the following teachings of the present invention have been read and understood. Further, the exact dimensions and dimensional proportions to conform to specific force, weight, strength and similar requirements will likewise be within the skill of the art after the following teachings of the present invention have been read and understood.

Figure 1:
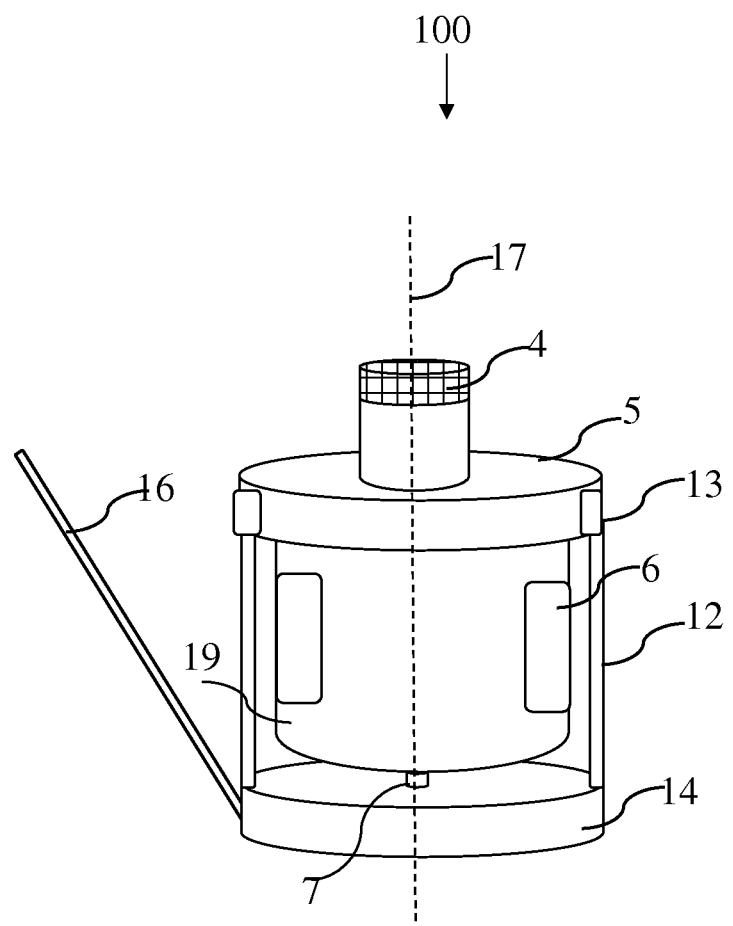
FIG. 1 is a perspective view of an apparatus for clearing debris from an area according to a first embodiment of the present invention.
Figure 2:
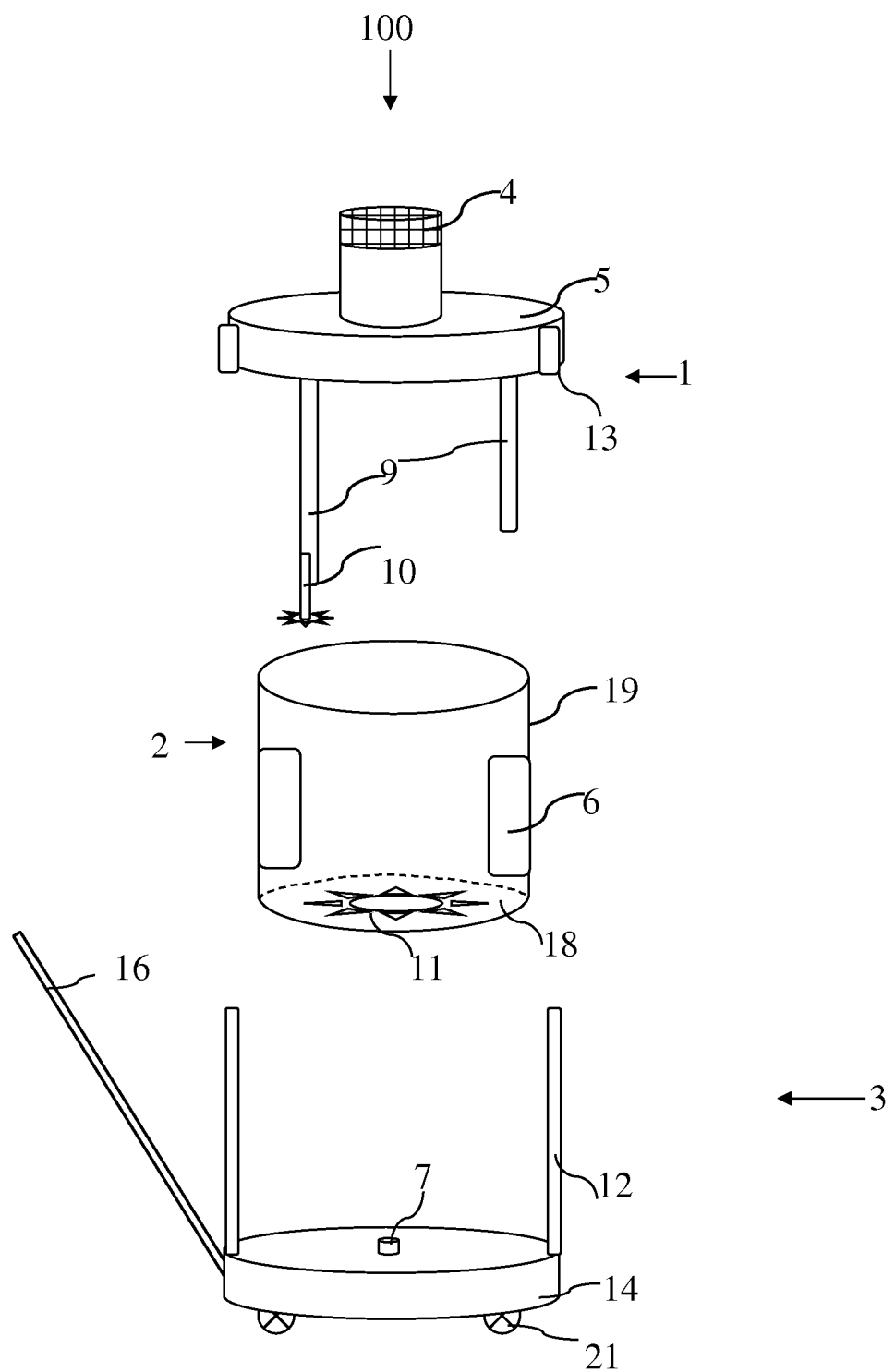
FIG. 2 is an exploded view of the apparatus of FIG. 1.
Figure 3:
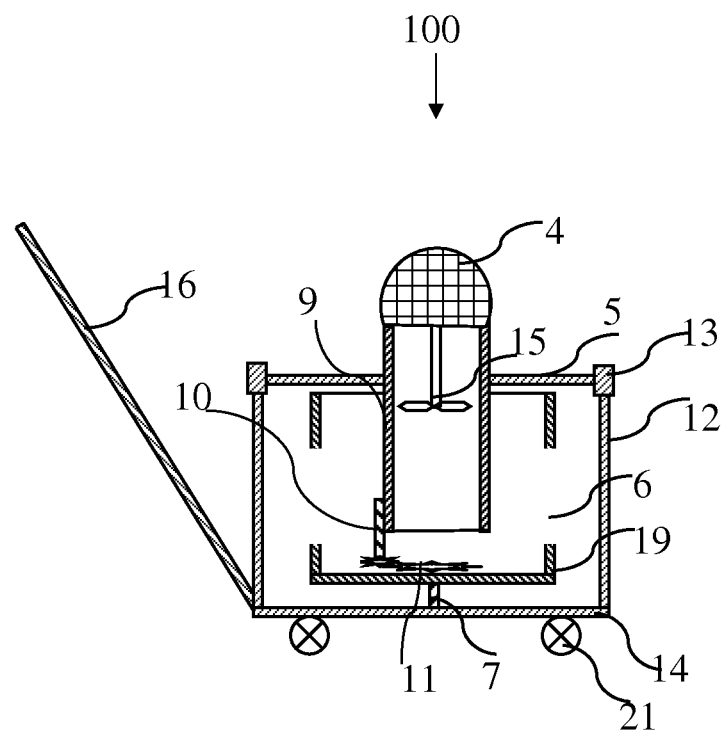
FIG. 3 is a cross sectional view of the apparatus of FIG. 1 as taken along the line 3-3.

A perspective elevation view of an embodiment of the apparatus 100 is shown in FIG. 1, which is further supported by FIGS. 2 and 3. FIG. 2 is a view of the apparatus 100 in FIG. 1, with the top member 1, the container 2 and the base member 3 taken apart. FIG. 3 is a cross-sectional elevation view along the vertical axis 17 as shown in FIG. 1.

The present invention discloses the apparatus 100 for drifting away loose items from an area. The apparatus 100 has a base member 3 with a container 2 rotatably supported on the base member 3. The container 2 has at least one outlet port. A top member 1 is fixedly connected to the base member 3 above the container 2. The top member 1 has a fan 15 therethrough adapted to draw air in from the exterior through an inlet port 4 and discharge the air into the interior of the container 2 to exit from the outlet port 6. A motor 10 secured to the top member 1, is adapted to engage with and rotate the container 2 relative to the base member 3 and the top member 1, such that the air exiting from the outlet port 6 is driven in a circular direction.

According to FIG. 2, the top member 1 of the apparatus 100 has the circular top portion 5 with the air inlet port 4. The top member 1 further comprises a fan 15 projecting downwards. The top member 1 also comprises a frame structure 9 onto which the motor 10 is provided. The container 2 is a cylinder with a bottom surface 18 and with two air outlet ports 6 on the curved surface 19. A circular base member 3 is provided with uprights 12 along its circumference 14. When assembled, the circular top portion 5 of the top member 1 is fitted onto the top portion of the container 2. The fan 15 and the frame structure 9 then get inserted within the interior of the container 2. During assembly of the apparatus 100, further the container 2 is rotatably attached to the base member 3 at the bottom surface 18 via the axle 7. The uprights 12 also can be secured into slots or apertures 13 in the circular top portion 5 of the top member 1, such that the container 2 as sandwiched between the top member 1 and the base member 3 is rotatable relative to the top and base members 1 and 3. When the apparatus 100 is assembled, the motor 10 gets coupled with a coupling feature such as a gear 11 attached with the bottom surface 18 of the container 2.

During operation of the apparatus 100 the fan 15 is axially rotatable for sucking air into the container 2 from the inlet port 4. The fan 15 is so designed that its rotation causes motion of the air around the vertical axis 17 of the apparatus 100 thereby creating an air pressure within the container 2. The pressurized air thus exits out of the container 2 from the outlet ports 6 as demonstrated in FIGS. 4a and 4b for two different orientations of the container 2 relative to the base member 3. During the operation of the apparatus 100 rotation of the motor 10 causes rotation of the container 2 about the vertical axis 17 and about the axle 7, thus exiting out the pressurized air in a circular direction 23 around the container 2.

The movement means like wheels 21 are shown in this embodiment that are attached beneath the base member 3 and are useful for wheeling the apparatus 100 between various locations, whether the apparatus 100 is in operation or not. Any other type of movement means may equally be used.

Figure 4A:
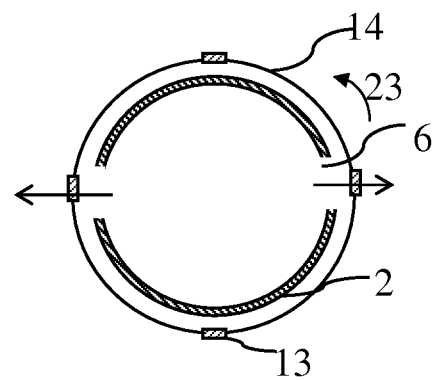
FIG. 4a is a cross sectional view of the apparatus of FIG. 1 as taken along the line 4-4 at a first position.
Figure 4B:
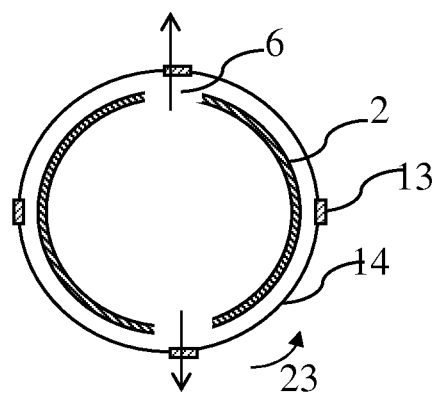
FIG. 4b is a cross sectional view of the apparatus of FIG. 1 as taken along the line 4-4 at a second position.

The pressurized air in circular direction 23 as illustrated in FIGS. 4a and 4b is useful in drifting away the loose items around the apparatus 100. The fan 15 may be detachable from the apparatus 100. Similarly, the motor 10 and the wheels 21 also may be detachable from the top member 1 and the base member 3 respectively.

The proposed apparatus 100 is particularly though not exclusively usable for drifting away loose items like snow, dry leaves or debris from an area.

According to an alternate embodiment, the motor 10 may be attached to the base member 3 instead of the top member 1 for rotating the container 2 from the exterior. This embodiment has not been shown here. Attaching the motor 10 to the base member 3 may help to lower the centre of gravity of the apparatus 100 thereby attaining better stability.

The apparatus 100 needs to be substantially enclosed when the apparatus 100 is in operation. As obvious, the only air inlet needs to be the inlet port 4 and the only air outlet needs to be the outlet port(s) 6.

The container 2 may be in a cylindrical shape with the curved surface 19 forming the upright side surface, as shown in FIG. 1. This helps in the formation of the coaxial circular direction 23 of the air around the container 2. However, the cylindrical shape is not a limitation. Other shapes for the container 2 may equally be used if beneficial in serving any specific purpose. For example, the upper part of the container 2 may be designed to be tapered (not shown) to reduce the overall volume of the apparatus 100, if affordable at the loss of the interior volume of the container 2 that reduces the volume of the pressurized air as well.

The outlet ports 6 in plurality instead of in single enhances the efficiency of the performance, as then more pressurized air is blown out of the outlet ports 6 to reinforce the circular direction 23 of the pressurized air.

Since the apparatus 100 in operation rotates about its vertical axis 17, for better stability the apparatus 100 may be designed to be substantially symmetrical about the vertical axis 17.

The apparatus 100 may be designed with any knowledge of dynamics as known in the art in order to improve upon the efficiency of the rotation of the apparatus 100 and to improve upon the air pressure in the coaxial circular direction 23.

The size of the inlet port 4 may be user adjustable for regulating the volume of air sucked in. Larger the size of the inlet port 4, higher is the air sucked in to cause more pressurized air to be blown out of the outlet ports 6. The size of the inlet port 4 may be reduced by the user for applications where lesser exiting of the pressurized air from the outlet ports 6 is desirable.

The apparatus 100 may optionally include an arm 16 for holding and moving the apparatus 100 while in operation or otherwise, to various locations. This arm 16 may preferably be attached to the base member 3 for better stability and as the base member 3 does not rotate during operation of the apparatus 100.

The outlet ports 6 may be adapted (not shown) for the user to regulate the direction of the pressurized air when blowing out from the outlet ports 6 relative to the container 2. The outlet ports 6 may also be adapted for the user to regulate the heights of the outlet ports 6 relative to the base member 3. These features are useful in providing a flexibility to the user to suit the particular application better.

The apparatus 100 may be substantially composed of a polymeric material for advantages of being non-corrosive and light weight. Any other material that is suitable for this application may equally be used.

The fan 15 may be electrically operable for automation as well as more consistent and reliable operation. Other methods in the art for powering the same are also possible like when mechanically operable by the user by remotely controlling from the arm 16 and the like.

As would be understood from the operation of the apparatus 100, it is meant for use to clear out loose items only as the pressurized air coming out of the outlet ports 6 is unlikely to be strong enough to substantially release items stuck to the area to be cleaned.

The purpose of the frame structure 9 is mainly to support the motor 10. In FIGS. 2 and 3, two elements have been shown in the frame structure 9 at 180 degrees with each other for balancing out their weights around the vertical axis 17. The frame structure 9 may have any other suitable shape and structure.

As to further discussion of the manner of usage and operation of the present invention, the same should be apparent from the above description. Accordingly, no further discussion relating to the manner of usage and operation will be provided.

While specific embodiments of the invention have been described and illustrated, such embodiments should be considered illustrative of the invention only and not as limiting the invention as construed in accordance with the accompanying claims.

What is claimed is:

1. An apparatus for blowing loose items away from an area, the apparatus comprising:
    a base member;
    a container rotatably supported on said base member, said container having an outlet port;
    a top member fixedly connected to said base member above said container, said top member having a fan therethrough adapted to draw air in from the exterior through an inlet port and discharge the air into the interior of said container to exit from said outlet port; and
    a motor secured to said top member, said motor being adapted to engage with and rotate said container relative to said base member and said top member, such that the air exiting from said outlet port is driven in a circular direction.

2. The apparatus according to claim 1 further comprising a plurality of said outlet ports in said container.

3. The apparatus according to claim 1, wherein the size of said inlet port is user adjustable for regulating the volume of air sucked in.

4. The apparatus according to claim 1 further comprises an arm for holding and moving the apparatus in operation or otherwise, to various locations.

5. The apparatus according to claim 1 wherein said outlet port(s) is/are user adjustable for regulating direction of the air exiting from said outlet port(s) relative to said container.

6. The apparatus according to claim 1 wherein said outlet port(s) is/are user adjustable for regulating their height(s) relative to said base member.

7. The apparatus according to claim 1 being at least partially composed of a polymeric material.

8. The apparatus according to claim 1 further comprising movement means for moving the apparatus between various locations.

9. A method for removing loose items away from an area, the method comprising:
    providing a base member and a top member fixedly connected to said base member;
    rotatably supporting a container on said base member between said base member and said top member, said container having an outlet port;
    drawing air in from the exterior through an inlet port in said top member into the interior of said container to exit from said outlet port; and
    rotating said container relative to said base member and said top member, such that the air exiting from said outlet port is driven in a circular direction.

\* \* \* \* \*